United States Patent [19]

Collins

[11] Patent Number: 5,446,580
[45] Date of Patent: Aug. 29, 1995

[54] PRIVACY TANNING SCREEN

[76] Inventor: Frederick L. Collins, 20917 Amie, No. 17, Torrance, Calif. 90503

[21] Appl. No.: 185,411

[22] Filed: Jan. 24, 1994

[51] Int. Cl.⁶ .................. G02B 5/22; E04H 15/58; E04H 15/00
[52] U.S. Cl. .................. 359/350; 135/117; 135/902; 359/361
[58] Field of Search ............ 359/350, 361; 135/117, 135/902; 607/95

[56] References Cited

U.S. PATENT DOCUMENTS

| | | |
|---|---|---|
| D. 90,866 | 10/1933 | Bielecky . |
| D. 160,368 | 10/1950 | Centerbar . |
| 789,982 | 5/1905 | Lockett .................. 135/117 |
| 1,654,874 | 1/1928 | Gussalli . |
| 1,669,484 | 5/1928 | Mowry . |
| 2,264,140 | 11/1941 | Mulberg .................. 359/361 |
| 2,295,402 | 9/1942 | Hildebrand . |
| 2,391,959 | 1/1946 | Gallowhur .................. 359/361 |
| 2,445,622 | 7/1948 | Lewk . |
| 2,619,101 | 11/1952 | McGerry et al. .................. 135/117 |
| 2,876,872 | 3/1959 | Roberts .................. 135/117 |
| 3,534,750 | 10/1970 | Kolozsvary .................. 135/117 |
| 3,670,750 | 6/1972 | Johnston . |
| 3,812,616 | 5/1974 | Koziol .................. 135/117 |
| 4,793,668 | 12/1988 | Longstaff .................. 359/361 |
| 4,798,427 | 1/1989 | Sear . |
| 5,066,082 | 11/1991 | Longstaff . |
| 5,085,212 | 2/1992 | DeCosta . |
| 5,176,774 | 1/1993 | Laniado et al. .................. 135/117 |

Primary Examiner—Martin Lerner
Attorney, Agent, or Firm—Richard C. Litman

[57] ABSTRACT

A privacy screen for tanning. The screen has a top screen panel and four vertical lateral wall screen panels, combining to form a canopy lowered over and covering a portion of a sunbather's torso. The screen panels are made from a material impervious to light in the visible spectrum and permeable to UV-A light. The top and two lateral screen panels are stored on reels enclosed in respective housings. The remaining two lateral screen panels are fastened, as by hook and loop material, to vertical legs holding the top screen panel above and spaced apart from the sunbather. Legs are adjustable as to height of the privacy screen. The two lateral screen panel housings are integral with two of four legs, which hold the canopy in its assembled configuration. The two remaining legs have external surfaces bearing hook and loop material for assembly of the canopy. The three housings are pivotally mounted to one another, so that when the canopy is disassembled, these housings fold parallel to one another, thus forming a compact configuration for stowage. In alternative embodiments, the legs include stakes for driving into the ground, or clamps, as for attachment to a beach chair. The novel privacy screen enables the user to sunbathe in public without clothing, the covered portions of the body being concealed to onlookers, while being entirely exposed to tanning rays.

9 Claims, 2 Drawing Sheets

PRIVACY TANNING SCREEN

BACKGROUND OF THE INVENTION

1. FIELD OF THE INVENTION

The present invention relates to a tanning screen which is impermeable to light in the visible spectrum, but which passes light within the UV-A band. The screen enables a user to expose the entire body to UV-A, or tanning rays of the sun, while concealing private parts of the body from onlookers.

2. DESCRIPTION OF THE PRIOR ART

Devices for enabling sunbathing while providing a measure of protection from onlookers and from undesirable light are known in the prior art. Patents illustrative of those incorporating a selectively light permeable material include U.S. Pat. Nos. 2,295,402, issued to Henry W. Hildebrand on Sep. 8, 1942; 4,798,427, issued to John Sear on Jan. 17, 1989; and 5,066,082, issued to Eric Longstaff on Nov. 19, 1991. The first of these references teaches a fully enclosed structure having a controlled environment. Cellulosic material is disclosed as providing selective passage of light for sunbathing, and furthermore teaches adding unspecified pigments for exclusion of undesirable wavelengths.

Sear '427 and Longstaff '082 provide more detailed description of specific materials which provide desired selective passage of the various wavelengths, and illustrate apparatuses employing the disclosed materials. These apparatuses include umbrellas, self-supported, free standing planar panels supported on a rectangular frame having four legs, and in one embodiment, a sun visor worn on the head.

A self-supported, stand alone sun screen is seen in U.S. Pat. No. 1,654,874, issued to Luigi Gussalli on Jan. 3, 1928. A corrugated element passes only light impinging substantially normally thereto, thereby preventing onlookers from observing a sunbather from an angle to the perpendicular to the screen. The screen is supported from a central point, and stands on a tripod or the like.

U.S. Pat. No. 2,445,622, issued to Ida B. Lewk on Jul. 20, 1948, discloses a similar device, and further includes a medium which passes ultraviolet light while excluding visible light. Lewk '622 provides a rigid frame extending along the periphery of the light transmitting panels and having legs.

Partial enclosures surrounding a sunbather while permitting entry of sunlight are seen in U.S. Pat. Nos. 1,669,484, issued to Charles W. Mowry on May 15, 1928; 3,670,750, issued to Edward W. Johnston on Jun. 20, 1972; and 5,085,212, issued to Sandra D. DeCosta on Feb. 4, 1992. These devices are open at the top to sunlight, and include tall lateral walls to provide privacy. Frames and legs penetrating the ground are shown in these patents.

Screens adapted for cooperation with a sunbathing chair, such as a chaise lounge, are also known. U.S. Pat. Nos. Des. 90,866, issued to Conrad Bielecky on Oct. 17, 1933, and 160,368, issued to Lorenzo R. Centerbar on Oct. 10, 1950, both illustrate screens or the like for a chaise lounge or a reclining chair. Bielecky '866 provides a fabric screen covering the head portion only of a chaise lounge, and Centerbar '368 provides a rigid tray projecting from an arm rest.

None of the above inventions and patents, taken either singly or in combination, is seen to describe the instant invention as claimed.

SUMMARY OF THE INVENTION

The present invention provides a portable, compact selectively transmissive screen which is erected over portions of a sunbather's body, and effectively conceals those portions from all angles of observation. The screen stores the screen elements rolled up in a cylindrical housing. Several screens panels are included, so that a protective canopy having roof and lateral walls is formed thereby, cooperating with the sunbather's body, and fitting sufficiently closely thereto as not to expose the same. In alternative embodiments, the screen is a self-contained, stand alone structure, or is adapted for attachment to a beach chair.

Accordingly, it is a principal object of the invention to provide a tanning screen which effectively conceals portions of a sunbather's body, while exposing the balance of the body to the sun.

It is another object of the invention to provide a tanning screen which stores individual screen elements compactly and which pays out the same for deployment.

It is a further object of the invention to provide a tanning screen which is attachable to an environmental surface.

Still another object of the invention is to provide a tanning screen which is collapses for storage and is and portable.

An additional object of the invention is to provide a tanning screen which selectively blocks visible light and passes tanning rays of the sun.

It is again an object of the invention to provide individual screen panels which cooperate in configuration with a sunbather's body.

Yet another object of the invention is to provide a tanning screen having a frame for supporting screen panels above and spaced apart from a sunbather's body.

Still a further object of the invention is to provide a tanning screen having legs attachable to an environmental surface, for supporting the screen in the deployed condition.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
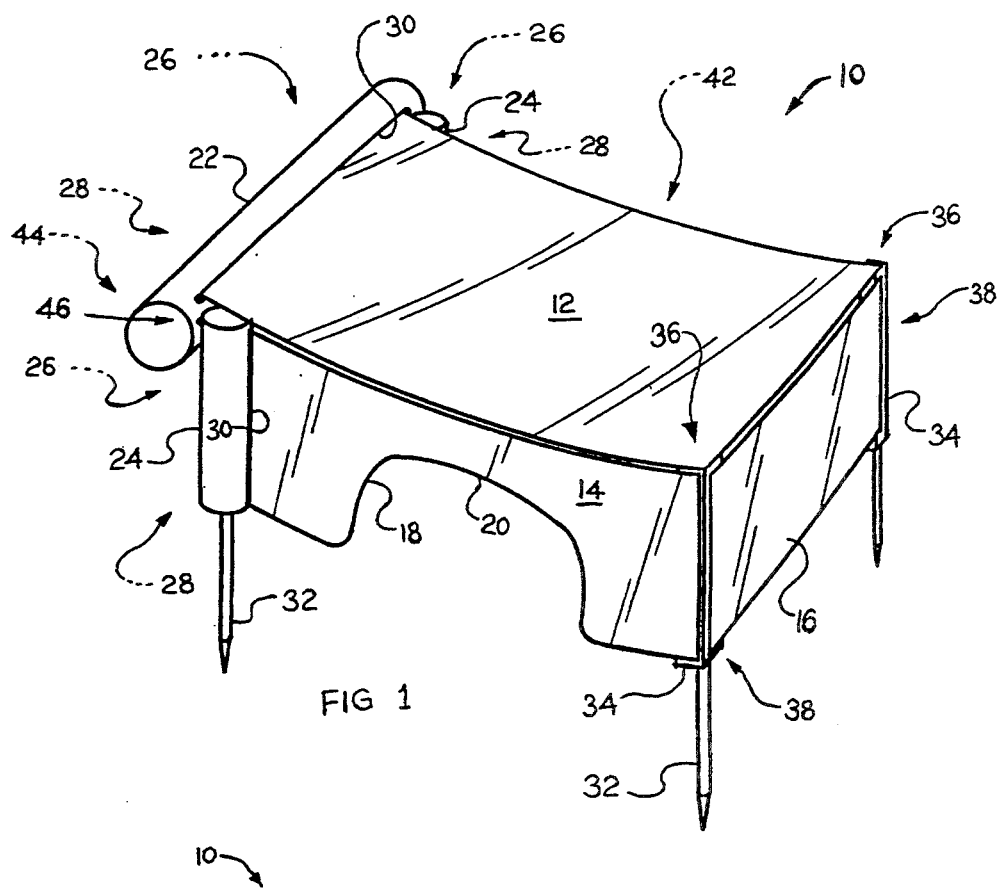
FIG. 1 is a perspective view of a first embodiment of the invention.
Figure 2:
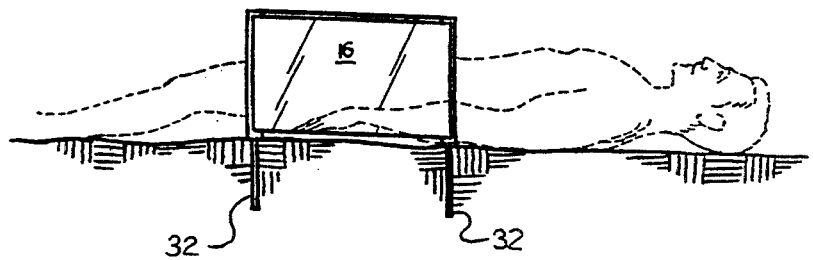
FIG. 2 is an environmental, side elevational view of the first embodiment of the invention, drawn to reduced scale.

Turning now to FIG. 1 of the drawings, the novel privacy screen 10 is seen in the assembled or deployed condition. Three screen portions 12,14,16 are visible in this view. Topmost screen portion 12 is disposed horizontally, above the torso of a user, and spaced apart therefrom, as seen in FIG. 2. Returning to FIG. 1, screen portion 14 is vertically oriented, and includes a body relief 18 formed therein. This body relief 18 cooperates with the user's torso in that when screen 10 is assembled and placed over a user, the torso is covered in close fitting fashion by screen portion 14 and does not interfere therewith. It will be appreciated that the highest point of that part of the torso covered by screen 10 is approximately even with a point along body relief 14 generally designated 20. It will further be appreciated that screen portion 12 is generally horizontal, and is spaced apart from the user's torso by a dimension corresponding to that part of screen portion 14 projecting above point 20.

Screen portions 12,14, or 16 are made from materials such as synthetic resins, formed in flexible sheets. Examples of suitable materials include vinyl chloride, polypropylene, and polymethylmethacrylate. Such materials are known to transmit light in the UV-A band of the spectrum and to be opaque to light in the visible band of the spectrum. Other materials having these properties, and additive substances modifying these properties will occur to those of skill in the art. The precise material is not crucial to the invention, and will not be further discussed herein.

The flexible sheets formed by screens portions 12,14,16 are stored within housings 22,24,24 and are supported in the deployed condition as follows. Housings 22,24,24 have therewithin reels 26 which are spring biased to retract or wind, there also being clutches 28 controlling retraction so as to maintain respective screen portions 12,14 or 16 unreeled. These reels 26 and clutches 28 act in well known fashion, illustratively being of the type commonly employed in reeled, retractable window shades. Housings 22,24,24 are preferably cylindrical, each having a slot 30 from which a screen 12,14, or 16 is pulled for deployment.

In the deployed condition, housings 24,24, which are pivotally mounted to housing 22, are arranged so as to extend vertically. Stakes 32 project downwardly, and engage an environmental surface, such as ground, or the sand of a beach, into which stakes 32 are driven. Screen portions 12, 14, and 16 are drawn out from their respective housings 22,24, or 24, and are fastened in place. Two legs 34,34 are additionally provided, and when combined with housings 24 and 24, which are fitted with stakes 32, provide a total of four legs.

Legs 34,34 have top and lateral surfaces 36, 38 and 38, which are covered with hook and loop material 40A (see FIG. 2). Corresponding strips of mating hook and loop material 40B are located on edges of screen portions 12,14, and 16. This is clearly shown in FIG. 4, as it pertains to screen portion 42. It will be understood that similar corresponding strips of mating hook and loop material are provided for the remaining screen portions 12,14,16,44. When the four legs are driven into the ground or sand, screen portions 12, 14, and 16 are fastened in place to legs 34,34 by contact of respective patches of hook and loop material 40A, 40B.

Front facing screen portion 14 and right side facing screen portion 16 have opposite counterparts, respectively designated at 42 and 44. Thus, five screen portions 12,14,16,42,44 are assembled over the user, and a close fitting canopy is defined thereby. As seen in FIG. 2, the canopy is supported on four legs so as to be solidly anchored within the ground or to a corresponding environmental surface, and is maintained in the deployed configuration.

Figure 3:
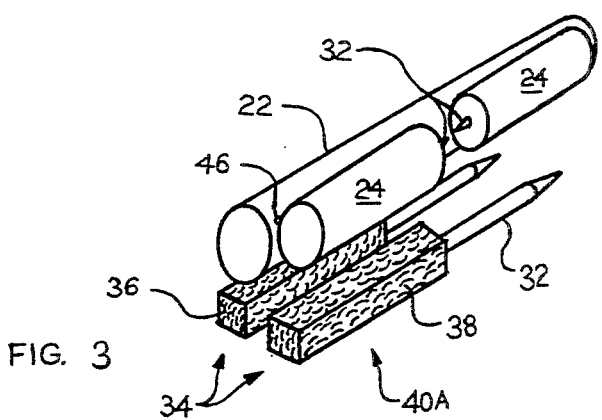
FIG. 3 is a perspective detail view of major components of the invention, shown folded for stowage.

When privacy screen 10 is stowed, it is folded compactly. This is shown in FIG. 3, although screen portions 16 and 44 (see FIG. 1, which remain separate from other components and do not have housings, are not shown. Stakes 32 are retracted into their respective legs 34,34 or housings 24. Screen portions 12, 14, and 42 are wound onto respective reels 26. Housings 24, pivotally mounted to housing 22, as by axles 46, are folded parallel. Legs 34,34 may be placed in a common carrier (not shown) with the other components of screen 10, and disassembled screen 10 is now compactly configured for portability.

Also clearly seen in this view are those surfaces of stakes 32 covered by hook and loop material 40A.

Figure 4:
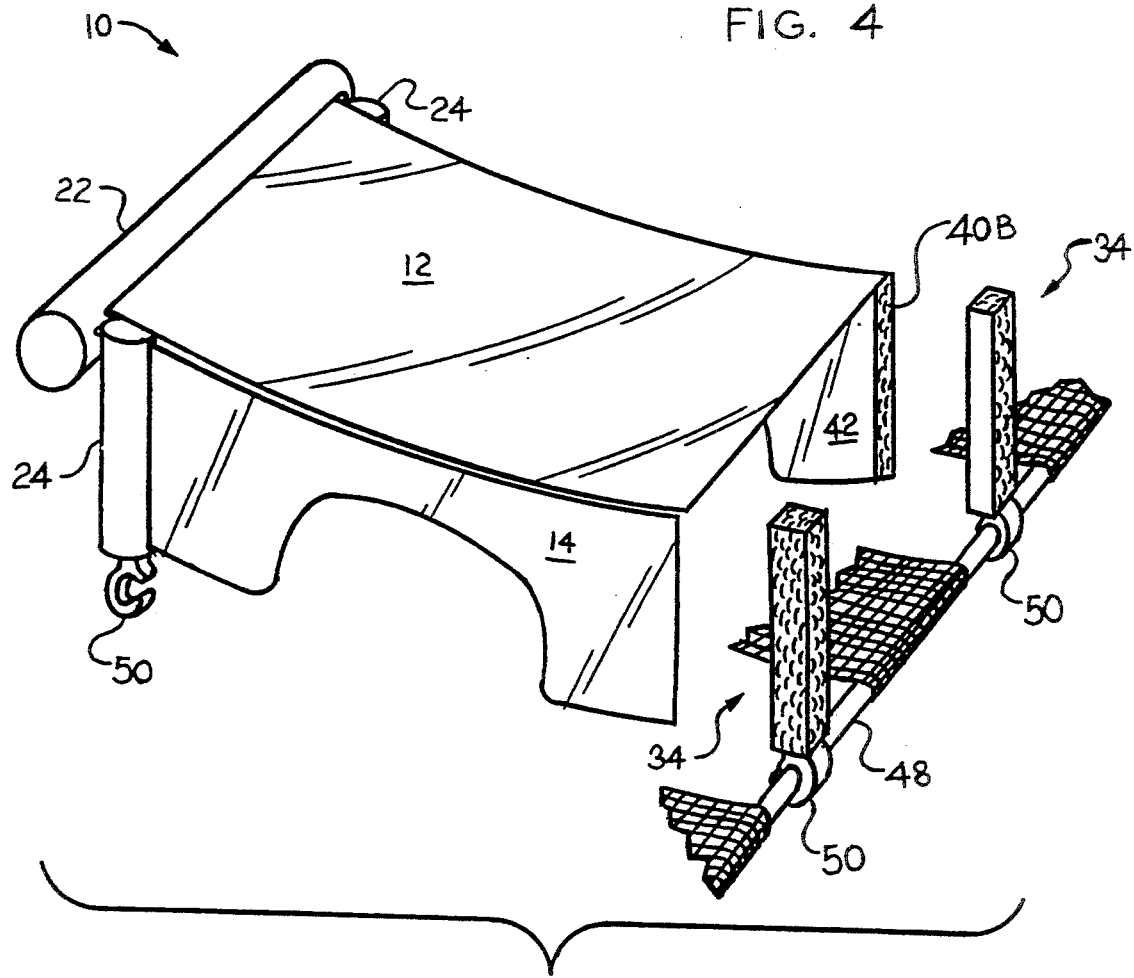
FIG. 4 is a fragmentary, partly exploded, perspective detail view of a second embodiment of the invention.

In a second embodiment, shown in FIG. 4, privacy screen 10 is adapted to adhere to a furniture member, such as a tubular frame member 48 of a beach chair. In either embodiment, a member engaging an environmental surface is provided. In this embodiment, stakes 32 (see FIG. 1), which formerly provided surface engaging members, are absent and clamps 50 are provided, so that the supporting environmental surface need not be the ground. Of course, clamp 50, which is made from a resilient material and which grips member 48, may be include other types of clamps (not shown).

Figure 5:
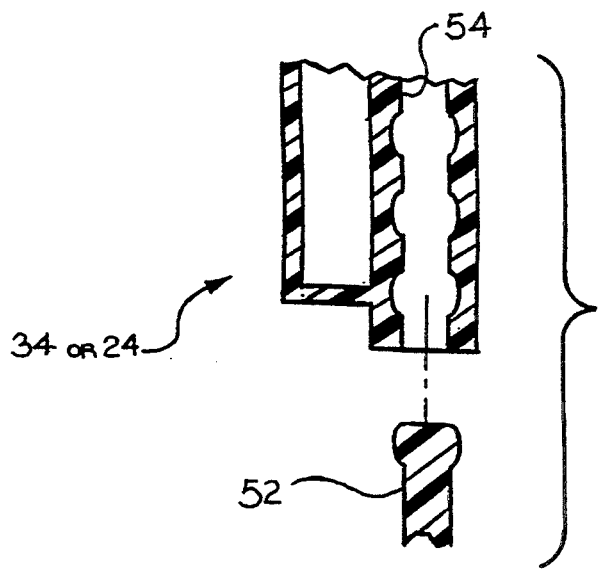
FIG. 5 is a diagrammatic, cross sectional detail view showing interfit of environmental attachment members to major components of the invention.

Preferably, stakes 32 and clamps 50 are adjustable as to height, and may be removable and interchangeable. As illustrated in FIG. 5, each stake 32 and clamp 50 (see FIGS. 1 and 4) includes a member for attachment to a leg 34 or housing 24, such as snap locking pin 52 formed at the top thereof. Pin 52 is inserted into a corresponding bore 54 formed in the body of leg 34 or housing 24. Bore 54 is configured to retain a pin 52 selectively at several positions therealong, and is sufficiently deep to enable stakes 32 to be inserted substantially thereinto, as illustrated in housings 24,24 in FIG. 3. This further renders novel privacy screen 10 compact for stowage.

When a stake 32 or clamp 50 is fully withdrawn, its counterpart 50 or 32 may be substituted therefor.

It is to be understood that the present invention is not limited to the embodiments described above, but encompasses any and all embodiments within the scope of the following claims.

I claim:

1. A privacy tanning screen having:
   a plurality of screens made from material which transmits light in the UV-A band, and which is opaque to light in the visible spectrum, said plurality of screens including,
   a topmost horizontally disposed screen, and
   four vertically disposed screens respectively facing to the front, to the rear, to the right side, and to the left side wherein two opposed said vertically disposed screens have means defining body reliefs formed therein and cooperating with a user's torso;
   a first housing containing a reel, means for winding at least one of said screens upon said reel, and means for maintaining said at least one screen unreeled; and legs for supporting said first housing and for supporting at least one of said screens above and spaced apart from the body of a sunbather, said legs including means engaging an environmental surface, said legs supporting said privacy tanning screen in a deployed condition.

2. The privacy tanning screen according to claim 1, said means for engaging an environmental surface further comprising clamps attachable to furniture members.

3. The privacy tanning screen according to claim 1, said means for engaging an environmental surface further comprising stakes for being driven into the ground.

4. The privacy tanning screen according to claim 1, said legs having disposed thereon separable manual fastening means and at least one of said screens having disposed thereon corresponding separable manual fastening means, at least one of said screens attaching to at least one of said legs when in a deployed condition.

5. The privacy tanning screen according to claim 1, further including second and third housings pivotally mounted to said first housing, each one of said second and third housings respectively including a second reel further including second means for winding one said screen thereupon, and second means for maintaining said one screen unreeled.

6. The privacy tanning screen according to claim 5, each one of said second and third housings being vertically disposed when in a deployed condition, and connected to one of said legs.

7. The privacy tanning screen according to claim 1, said legs including means enabling adjustment of height of said legs with respect to said privacy tanning screen.

8. A privacy tanning screen having:
a plurality of screens made from material which transmits light in the UV-A band, and which is opaque to light in the visible spectrum, there being a topmost, horizontally disposed screen, and four vertically disposed screens respectively facing to the front, to the rear, to the right side, and to the left side, two opposed ones of said vertical screens having means defining body reliefs formed therein and cooperating with a user's torso;
a first housing containing a first reel, first means for winding one of said plurality of screens upon said first reel, and first means for maintaining said one screen unreeled;
two second housings pivotally mounted to said first housing, and further including respective second reels, and respective second means for maintaining said second reels unreeled; and
legs for supporting said housing and for supporting at least one of said at least one screen above and spaced apart from the body of a sunbather, said legs including means for attachment to an environmental surface, comprising clamps attachable to furniture members, and said legs having disposed thereon separable manual fastening means and said screen having disposed thereon corresponding separable manual fastening means, at least one of said at least one screen attaching to and being partially supported on said legs when in a deployed condition, each one of said legs having means for adjustment of height of said privacy tanning screen with respect to each said leg, each one of said second housings connected to one of said legs.

9. A privacy tanning screen having:
a plurality of screens made from material which transmits light in the UV-A band, and which is opaque to light in the visible spectrum, there being a topmost, horizontally disposed screen, and four vertically disposed screens respectively facing to the front, to the rear, to the right side, and to the left side, two opposed ones of said vertical screens having means defining body reliefs formed therein and cooperating with a user's torso;
a first housing containing a first reel, first means for winding one of said plurality of screens upon said first reel, and first means for maintaining said one screen unreeled;
two second housings pivotally mounted to said first housing, and further including respective second reels, and respective second means for maintaining said second reels unreeled; and
legs for supporting said housing and for supporting at least one of said at least one screen above and spaced apart from the body of a sunbather, said legs including means for attachment to an environmental surface, comprising stakes for being driven into the ground, and said legs having disposed thereon separable manual fastening means and said screen having disposed thereon corresponding separable manual fastening means, at least one of said at least one screen attaching to and being partially supported on said legs when in a deployed condition, each one of said legs having means for adjustment of height of said privacy tanning screen with respect to each said leg, each one of said second housings connected to one of said legs.

* * * * *